United States Patent [19]

Adams et al.

[11] 4,374,948

[45] Feb. 22, 1983

[54] HIGH NITRILE COPOLYMER LATEX COATING

[75] Inventors: Richard C. Adams, Chardon; Steven J. Waisala, Shaker Heights, both of Ohio

[73] Assignee: The Standard Oil Company, Cleveland, Ohio

[21] Appl. No.: 266,778

[22] Filed: May 26, 1981

[51] Int. Cl.$^3$ .............................................. C08K 5/34
[52] U.S. Cl. ............................... 524/516; 427/388.3; 427/388.4; 525/310
[58] Field of Search ............... 260/29.6 AN, 29.7 UP; 525/310; 427/388.3, 388.4; 524/516

[56] References Cited

U.S. PATENT DOCUMENTS

| | | | |
|---|---|---|---|
| 3,426,102 | 2/1969 | Solak et al. | 260/879 |
| 3,503,918 | 3/1970 | Sota et al. | 260/29.7 |
| 3,586,737 | 6/1971 | Duke et al. | 260/879 |
| 3,763,278 | 10/1973 | Griffith | 260/880 R |
| 3,843,578 | 10/1974 | Logemann et al. | 260/29.6 AN |
| 3,907,737 | 9/1975 | Marx et al. | 260/29.6 NR |
| 4,238,535 | 12/1980 | Talsma et al. | 427/388.4 |

OTHER PUBLICATIONS

"Polymer Handbook", ed. by J. Brandrup and E. H. Immergut, Interscience, New York, 1966, p. I-1.

*Primary Examiner*—Joseph L. Schofer
*Assistant Examiner*—Bernard Lipman
*Attorney, Agent, or Firm*—William D. Mooney; Herbert D. Knudsen; Larry W. Evans

[57] ABSTRACT

It has been discovered that nitrile barrier resin latexes containing a polyvinyl pyrrolidone compound are especially effective for coating various substrates.

14 Claims, No Drawings

HIGH NITRILE COPOLYMER LATEX COATING

BACKGROUND OF THE INVENTION

This invention relates to nitrile barrier resin latex coatings which contain a thickener comprising polyvinyl pyrrolidone. These coatings are an improvement over the coatings described in U.S. Ser. No. 135,383, which is herein incorporated by reference.

Many varieties of coating compositions have been used in the past based on various polymeric materials. These coatings are either solvent-type or aqueous-type. The solvent-type coatings are disadvantageous in that large amounts of volatile organic solvents are present. These solvents are costly and hazardous. The aqueous-type coatings, especially nitrile barrier resin coatings, are also disadvantageous in that they generally are not continuous and often have been found to contain pin holes, voids and the like.

The aqueous dispersion coatings of this invention avoid the disadvantages of the solvent-type coating composition by the use of water as the predominating component of the solution. Moreover, the problems normally associated with latex coatings have been solved by the addition of a particular class of thickening agents which are more fully described below. These coatings also have good chemical resistance and are excellent oxygen barriers.

The thickening agents are also advantageous in that they reduce sagging so that the coating will not run off the substrate. Finally, these thickening agents exhibit thixotropy so that when shear is applied to the latex over a period of time, the apparent viscosity decreases. The viscosity returns to its original value when the shear is removed. This thixotropic behavior is evidence of an interaction between latex particles and thickener molecules.

SUMMARY OF THE INVENTION

This invention relates to a coating composition comprising an aqueous latex of a nitrile barrier resin and a thickener comprising a water soluble polyvinyl pyrrolidone compound which has an intrinsic viscosity greater than 0.75 dl/gm. The preferred nitrile barrier resins comprise a copolymer produced by the polymerization of a major proportion of a monounsaturated nitrile and a minor proportion of another monovinyl monomer component copolymerizable therewith optionally in the presence of a preformed rubber polymer.

DETAILED DESCRIPTION

The nitrile barrier resin latex useful in the inventive coating can be prepared by any method known in the art. Preferably, these latexes are prepared by the polymerization in emulsion of a major proportion of an olefinically unsaturated nitrile, another monovinyl monomer component copolymerizable therewith and optionally a preformed rubber component. This emulsion polymerization is carried out in an aqueous medium in the presence of an emulsifier and a free radical generating polymerization initiator at a temperature of from about 0° to 100° C. in the substantial absence of molecular oxygen. The preparation of typical latexes are more fully described in U.S. Pat. Nos. 3,426,102, 3,586,737 and 3,763,278, which are herein incorporated by reference. Usually the latex (or blend of latexes) used in this invention will contain from about 15% to 45% solids and will have an average particle size ranging from 500 to 3,000 angstroms.

The olefinically unsaturated nitriles used in the present invention are the alpha, beta-olefinically unsaturated mononitriles having the structure:

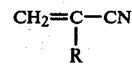

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monovinyl monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include those having the structure:

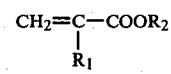

wherein $R_1$ is hydrogen, an alkyl group having from 1 to 30 carbon atoms, or a hologen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

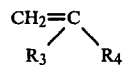

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1 and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

The olefinic nitrile copolymer is optionally in the presence of a preformed diene rubber which may be a homopolymer or copolymer of a conjugated diene monomer.

The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3 and the like. Most preferred for the purpose of this invention are butadiene-1,3 and isoprene because of their ready availability and their excellent polymerization properties.

The conjugated diene monomer may be copolymerized with a comonomer selected from the group consisting of vinyl aromatic monomer, an olefinic nitrile monomer having the structure:

$$CH_2=C-CN$$
$$\mid$$
$$R$$

wherein R has the foregoing designation, and an ester having the structure:

$$CH_2=C-COOR_2$$
$$\mid$$
$$R_1$$

wherein $R_1$ and $R_2$ have the foregoing designations. The rubbery polymer contains from 50% to 100% by weight of polymerized conjugated diene monomer and from 0% to 50% by weight of a comonomer.

Preferred polymers useful in this invention are those prepared by the polymerization of 100 parts by weight of (A) from 60% to 90% by weight of at least one nitrile having the structure:

$$CH_2=C-CN$$
$$\mid$$
$$R$$

wherein R has the foregoing designation, and
(B) from 10% to 40% by weight based on the combined weights of (A) and (B) of at least one member selected from the group consisting of
(1) an ester having the structure:

$$CH_2=C-COOR_2$$
$$\mid$$
$$R_1$$

wherein $R_1$ and $R_2$ have the foregoing respective designations,
(2) an alpha-olefin having the structure:

$$CH_2=C$$
$$\diagup \quad \diagdown$$
$$R_3 \quad R_4$$

wherein $R_3$ and $R_4$ have the foregoing respective designations,
(3) a vinyl ether selected from the group consisting of methyl vinyl ether, ethyl vinyl ether, the propyl vinyl ethers, and the butyl vinyl ethers,
(4) vinyl acetate,
(5) styrene, and
(6) indene,
in the presence of from 0 to 40 parts by weight of
(C) a rubbery polymer of a conjugated diene monomer selected from the group consisting of butadiene and isoprene and optionally a comonomer selected from the group consisting of styrene, a nitrile monomer having the structure:

$$CH_2=C-CN$$
$$\mid$$
$$R$$

wherein R has the foregoing designation, and an ester having the structure:

$$CH_2=C-COOR_2$$
$$\mid$$
$$R_1$$

wherein $R_1$ and $R_2$ have the foregoing respective designations, said rubbery polymer containing from 50% to 100% by weight of polymerized conjugated diene and from 0% to 50% by weight of a comonomer.

More preferred polymers useful in this invention are those prepared by the polymerization of more than 70 parts by weight of a monounsaturated nitrile and less than 30 parts by weight of a monovinyl monomer component copolymerizable with said nitrile optionally in the presence of a preformed diene rubber.

Thickening agents have now been discovered which, when blended with the nitrile barrier resin latexes described above, result in coatings which are more rust resistant than previously known aqueous coatings. These thickening agents are water soluble polymers comprising polyvinyl pyrrolidone. Preferably, the polymers comprise at least 50% polyvinyl pyrrolidone and more preferably at least 70% polyvinyl pyrrolidone. It has also been discovered that only those polyvinyl pyrrolidone containing polymers which have an intrinsic viscosity greater than 0.75 are effective as thickening agents. Preferred polymers have an intrinsic viscosity greater than 1.0. The amount of the thickening agent varies between 0.01 to 2% by weight, preferably about 0.1 to 1%, based on the total weight of the latex. The thickener is normally added in the form of a solution with water.

It will be readily apparent to those skilled in the art that the coating compositions of this invention may be further modified by the addition of plasticizers, stabilizers, pigments, dispersants, defoamers, surfactants, extenders and other film formers.

The instant latex coatings are useful for a wide variety of coating applications. For example, substrates comprising metal, wood and paper can be coated by the instant coating. However, when coating a metal surface, it is preferred that the metal be first treated with an etching material to thoroughly clean said surface. The coating compositions can be applied to the substrate by means of a doctor knife or draw bar, airless spray, a roller coater, a conventional or electrostatic air spray gun, by dipping the substrate into the coating formulation, by flow coating or by other means known to those skilled in the art.

After the coating has been applied to the substrate, it is dried at a temperature between room temperature and 350° C. or higher. The drying temperature and procedure will vary depending upon the composition of the coating and the time in the oven. Coatings which do not contain any pigments are preferably baked at 85° to 180° C., more preferably at 90° to 160° C., for from 30 seconds to 45 minutes, more preferably 4 to 8 minutes, and then baked at 140° to 300° C., more preferably for 160° to 240° C., for from 30 seconds to 45 minutes, more preferably 4 to 8 minutes. The first bake evaporates most of the water and aids in good film formation while the second bake completes the fusion of the film particles and removes substantially all of the volatiles. Coatings which contain pigment are preferably baked at 150° to 300° C., more preferably 180° to 240° C. for from 30 seconds to 45 minutes, more preferably for 4 to 8 minutes.

SPECIFIC EMBODIMENTS

This invention will be further illustrated by the following examples wherein the amounts of ingredients are given in parts by weight unless otherwise indicated.

COMPARATIVE EXAMPLES A AND B

A nitrile barrier resin latex was prepared by polymerizing 75 parts of acrylonitrile and 25 parts of methyl acrylate with an acrylonitrile-butadiene rubber as described in Examples 1A and 1B of U.S. Pat. No. 3,426,102. This latex was sprayed on two Bonderite 40 TM phosphate steel panels (trademark of Oxy Metal Industries, Inc.—Parker Division). The coated panels were then baked at 180° to 200° C. for about 4 minutes. The dry film thickness was 0.6 to 0.9 mils. The panels were then tested in a salt spray (ASTM D-610). One panel was removed after 240 hours and had a rust rating (ASTM 610-68) of 0 to 1. The other panel was removed after 1,000 hours and had a rust rating of 0.

EXAMPLES 1 and 2

A thickening agent (0.6 parts of Rohm & Haas' E-845, a polymer containing about 74% vinyl pyrrolidone, 19% ethyl acrylate and methacrylate, 3% methyl acrylate and methacrylate and about 4% acrylate salt), was slowly added over 5 minutes to the latex (100 parts) prepared in Comparative Example A. This thickener was about 20% by weight solids in an aqueous solution. The thickened latex was then sprayed on two Bonderite 40 TM phosphated steel test panels. These panels were baked at 210° C. for 4 minutes. The panels were then placed in the salt spray test described in Comparative Example A. One panel was removed after 240 hours and had a rust rating of 4 to 5. The other panel was removed after 1,000 hours and had a rust rating of 4.

COMPARATIVE EXAMPLE C

A thickening agent comprising polyvinyl pyrrolidone (35 parts of a solution of GAF's PVP-K-60) was slowly added over 5 minutes to 100 parts of the latex prepared in Comparative Example A. This thickener was about 45% by weight solids in an aqueous solution. After setting for 24 hours, the resultant solution was placed in a Brookfield Viscometer, RVF Model, Spindle No. 3, 20 RPM. The initial viscosity in the Brookfield Viscometer was 2250 CPS and after 10 minutes the viscosity increased to 2450 CPS. The intrinsic viscosity of the PVP-K-60 was determined to be 0.75 dl/gm in a Cannon-Ubbelohole Dilution Viscometer.

COMPARATIVE EXAMPLE D

A thickening agent which has a high molecular weight and is water soluble but which is not a polyvinyl pyrrolidone copolymer was used in place of the thickening agent of Comparative Example C. This thickening agent (30 parts of a solution of Natrosol 250 HR—a hydroxy ethyl ether of cellulose) was slowly added over 5 minutes to 100 parts of the latex prepared in Comparative Example A. This thickener was about 2.0% by weight solids in an aqueous solution. The experimental procedure of Comparative Example C was repeated and it was found that the initial viscosity was 1250 CPS and that after 10 minutes the viscosity was unchanged.

COMPARATIVE EXAMPLE E

A thickening agent comprising an alkylated polyvinyl pyrrolidone which is not water soluble was used in the experimental apparatus described in Comparative Example C. This thickening agent (6 parts of a solution of GAF's Ganvex V220) was slowly added over 5 minutes to 100 parts of the latex prepared in Comparative Example A. This thickener was about 20% by weight solids in a 50/50 DMF/toluene solution. No viscosity change was observed after 10 minutes in a Brookfield Viscometer.

EXAMPLE 3

A thickening agent comprising a high molecular weight polyvinyl pyrrolidone (3.5 parts of a solution of GAF's PVP-K-90) was slowly added over 5 minutes to 100 parts of the latex prepared in Comparative Example A. This thickener was about 20% by weight solids in an aqueous solution. The solution was tested in the Brookfield Viscometer described in Comparative Example C and it was found that the initial viscosity was 2000 CPS and that this viscosity decreased under shear so that after 10 minutes the viscosity was 1450 CPS. The intrinsic viscosity of the PVP-K-90 thickening agent was determined to be 2.01 dl/gm.

EXAMPLE 4

A thickening agent comprising 4 parts of Rohm & Haas' E-845 was slowly added over 5 minutes to 100 parts of the latex prepared in Comparative Example A. This thickener was about 20% by weight solids in an aqueous solution. This solution was also tested in the Brookfield Viscometer. The viscosity decreased under shear from the initial value of 2150 to a value after 10 minutes of 1450 CPS. The intrinsic viscosity of E-845 was determined to be 1.07 dl/gm.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A coating composition comprising (1) a water soluble polymeric thickener comprising a homopolymer or copolymer of vinyl pyrrolidone which has an intrinsic viscosity greater than 0.75 dl/gm, and (2) a latex produced by polymerization in aqueous medium of a major portion of a monounsaturated nitrile having the structure

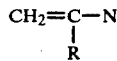

wherein R is hydrogen, a lower alkyl group having from 1 to 4 carbon atoms or a halogen, and a minor portion of at least one monovinyl monomer copolymerizable therewith optionally in the presence of a preformed diene rubber.

2. The composition of claim 1 wherein the latex comprises a polymer comprising (A) from 60% to 90% by weight of at least one nitrile having the structure:

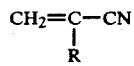

wherein R is hydrogen, a lower alkyl group having from 1 to 4 carbon atoms, or a halogen, and (B) from 10% to 40% by weight based on the combined weights of (A) and (B) of at least one member selected from the group consisting of (1) an ester having the structure:

$$CH_2=C-COOR_2$$
$$\quad\quad |$$
$$\quad\quad R_1$$

wherein $R_1$ is hydrogen, an alkyl group having from 1 to 30 carbon atoms, or halogen, and $R_2$ is an alkyl group having from 1 to 6 carbon atoms, (2) an alpha-olefin having the structure:

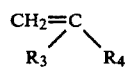

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers and the butyl vinyl ethers, (4) vinyl acetate, (5) styrene, and (6) indene, and from 0 to 40 parts by weight of (C) a rubbery polymer of a conjugated diene monomer selected from the group consisting of butadiene and isoprene and a comonomer selected from the group consisting of styrene, a monomer having the structure:

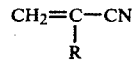

wherein R has the foregoing designation, and an ester having the structure:

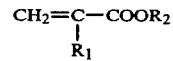

wherein $R_1$ and $R_2$ have the foregoing respective designations, said rubbery polymer containing from 50% to 100% by weight of polymerized conjugated diene and from 0% to 50% by weight of a comonomer.

3. The composition of claim 2 wherein (A) is acrylonitrile.

4. The composition of claim 2 wherein (B) is methyl acrylate.

5. The composition of claim 2 which contains more than 70% of (A) and less than 30% of (B).

6. The composition of claim 2 wherein the polymer contains 5 to 15 parts of (C).

7. The composition of claim 1 wherein at least 50% of the units in the polyvinyl pyrrolidone copolymer comprise vinyl pyrrolidone units.

8. The composition of claim 1 wherein at least 70% of the units in the polyvinyl pyrrolidone copolymer comprise vinyl pyrrolidone units.

9. The composition of claim 1 wherein the vinyl pyrrolidone polymer is a copolymer of vinyl pyrrolidone and at least one alkyl acrylate.

10. The composition of claim 1 wherein the coating contains less than 2% by weight of (1).

11. The composition of claim 1 wherein the coating contains less than 1% by weight of (1).

12. The composition of claim 1 wherein (1) has an intrinsic viscosity greater than 1.0 dl/gm.

13. The composition of claim 1 wherein (1) has an intrinsic viscosity greater than 2.0 dl/gm.

14. A process for preparing a coating composition comprising blending (1) a latex produced by the polymerization in aqueous medium of a major portion of a monounsaturated nitrile having the structure

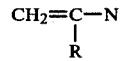

wherein R is hydrogen, a lower alkyl group having from 1 to 4 carbon atoms or a halogen and a minor portion of at least one monovinyl monomer copolymerizable therewith optionally in the presence of a preformed diene rubber; and (2) a water soluble polymeric thickener comprising a homopolymer or copolymer of vinyl pyrrolidone which has an intrinsic viscosity greater than 0.75 dl/gm.

* * * * *